(12) United States Patent
Edge

(10) Patent No.: US 9,026,134 B2
(45) Date of Patent: May 5, 2015

(54) TARGET POSITIONING WITHIN A MOBILE STRUCTURE

(75) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 13/335,857

(22) Filed: Dec. 22, 2011

(65) Prior Publication Data

US 2012/0172055 A1  Jul. 5, 2012

Related U.S. Application Data

(60) Provisional application No. 61/429,337, filed on Jan. 3, 2011.

(51) Int. Cl.
*H04W 24/00* (2009.01)
*H04W 64/00* (2009.01)
(Continued)

(52) U.S. Cl.
CPC ............. *H04W 64/00* (2013.01); *G01S 5/0018* (2013.01); *G01S 5/0236* (2013.01); *G01S 5/0242* (2013.01); *G01S 5/0284* (2013.01)

(58) Field of Classification Search
CPC ......... H04W 4/02; H04W 4/04; H04W 64/00; H04W 64/003
USPC .......... 455/456.1, 456.2, 456.3, 456.6, 414.1, 455/440.1, 440, 404.2
See application file for complete search history.

(56) References Cited

U.S. PATENT DOCUMENTS

| | | |
|---|---|---|
| 6,580,915 B1 | 6/2003 | Kroll |
| 7,460,866 B2 | 12/2008 | Salkini et al. |
| 7,839,289 B2 | 11/2010 | Chung et al. |

(Continued)

FOREIGN PATENT DOCUMENTS

| | | |
|---|---|---|
| EP | 2161588 A1 | 3/2010 |
| JP | H05141980 A | 6/1993 |

(Continued)

OTHER PUBLICATIONS

International Search Report and Written Opinion—PCT/US2012/020008—ISA/EPO—May 7, 2012.

(Continued)

*Primary Examiner* — Khalid Shaheed
(74) *Attorney, Agent, or Firm* — Silicon Valley Patent Group LLP

(57) ABSTRACT

Method and apparatus for determining position of a target device relative to a mobile structure are disclosed. The method includes obtaining measurements by the target device with respect to a plurality of radio beacons, determining whether the target device is on the mobile structure using the measurements, and determining location of the target device relative to the mobile structure using the measurements. The method of determining whether the target device is on the mobile structure includes at least one of comparing motion of target device with motion of mobile structure, detecting mobile radio beacon(s) on the mobile structure from the target device over a period of time, comparing velocity and location of the target device with respect to velocity and location of the mobile structure, comparing measurements obtained by target device from the plurality of radio beacons, and comparing locations obtained by target device from the plurality of radio beacons.

48 Claims, 8 Drawing Sheets

(51) Int. Cl.
  *G01S 5/00* (2006.01)
  *G01S 5/02* (2010.01)

(56) References Cited

U.S. PATENT DOCUMENTS

| | | | |
|---|---|---|---|
| 8,493,442 B2* | 7/2013 | Fernandez et al. | 348/143 |
| 2003/0011511 A1* | 1/2003 | King et al. | 342/357.02 |
| 2003/0212487 A1 | 11/2003 | Dooley et al. | |
| 2005/0054351 A1 | 3/2005 | McAlexander | |
| 2007/0021122 A1 | 1/2007 | Lane et al. | |
| 2008/0062940 A1* | 3/2008 | Othmer et al. | 370/338 |
| 2008/0274752 A1* | 11/2008 | Houri | 455/456.1 |
| 2008/0309550 A1 | 12/2008 | Sairo et al. | |
| 2009/0040043 A1 | 2/2009 | Rohr et al. | |
| 2010/0066517 A1 | 3/2010 | Posselius et al. | |
| 2010/0227593 A1* | 9/2010 | Myr | 455/414.1 |
| 2010/0331012 A1* | 12/2010 | Zhang | 455/456.2 |
| 2011/0251787 A1* | 10/2011 | Gupta et al. | 701/201 |
| 2011/0281564 A1* | 11/2011 | Armitage et al. | 455/414.1 |
| 2011/0298658 A1* | 12/2011 | Riley et al. | 342/357.26 |

FOREIGN PATENT DOCUMENTS

| | | |
|---|---|---|
| JP | 2002148071 A | 5/2002 |
| JP | 2004510138 A | 4/2004 |
| JP | 2008107218 A | 5/2008 |
| JP | 2009210473 A | 9/2009 |
| JP | 2010519550 A | 6/2010 |
| WO | 0225309 A1 | 3/2002 |
| WO | WO2004038638 A2 | 5/2004 |
| WO | WO2006043123 A1 | 4/2006 |
| WO | 2008118578 A2 | 10/2008 |
| WO | 2010124011 A2 | 10/2010 |

OTHER PUBLICATIONS

Manodham et al., "A Novel Wireless Positioning System for Seamless Internet Connectivity based on the WLAN Infrastructure", Wireless Personal Communications, Oct. 4, 2007, pp. 295-309, vol. 44, No. 3, Kluwer Academic Publishers, XP019582194, ISSN: 1572-834X.

* cited by examiner

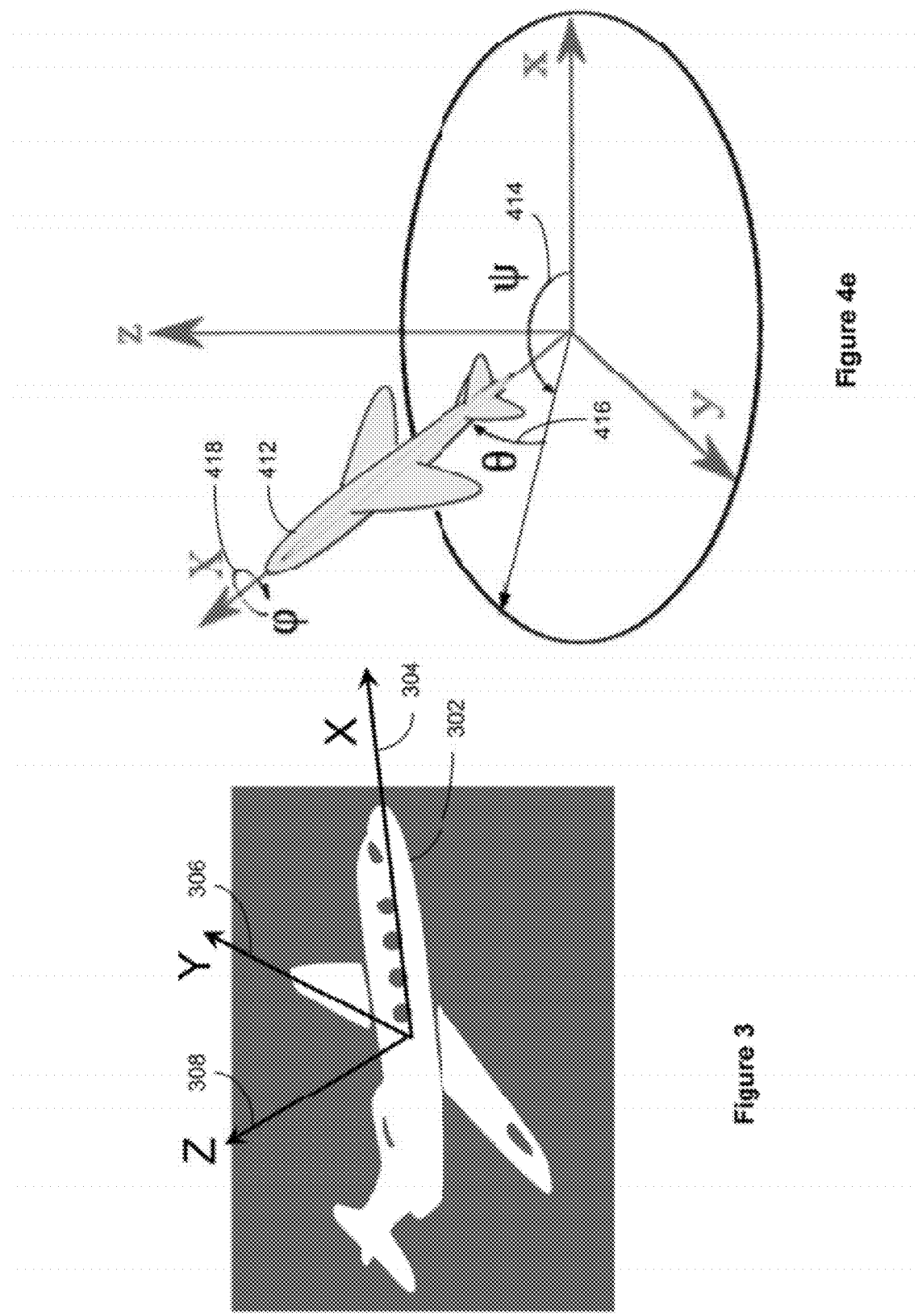

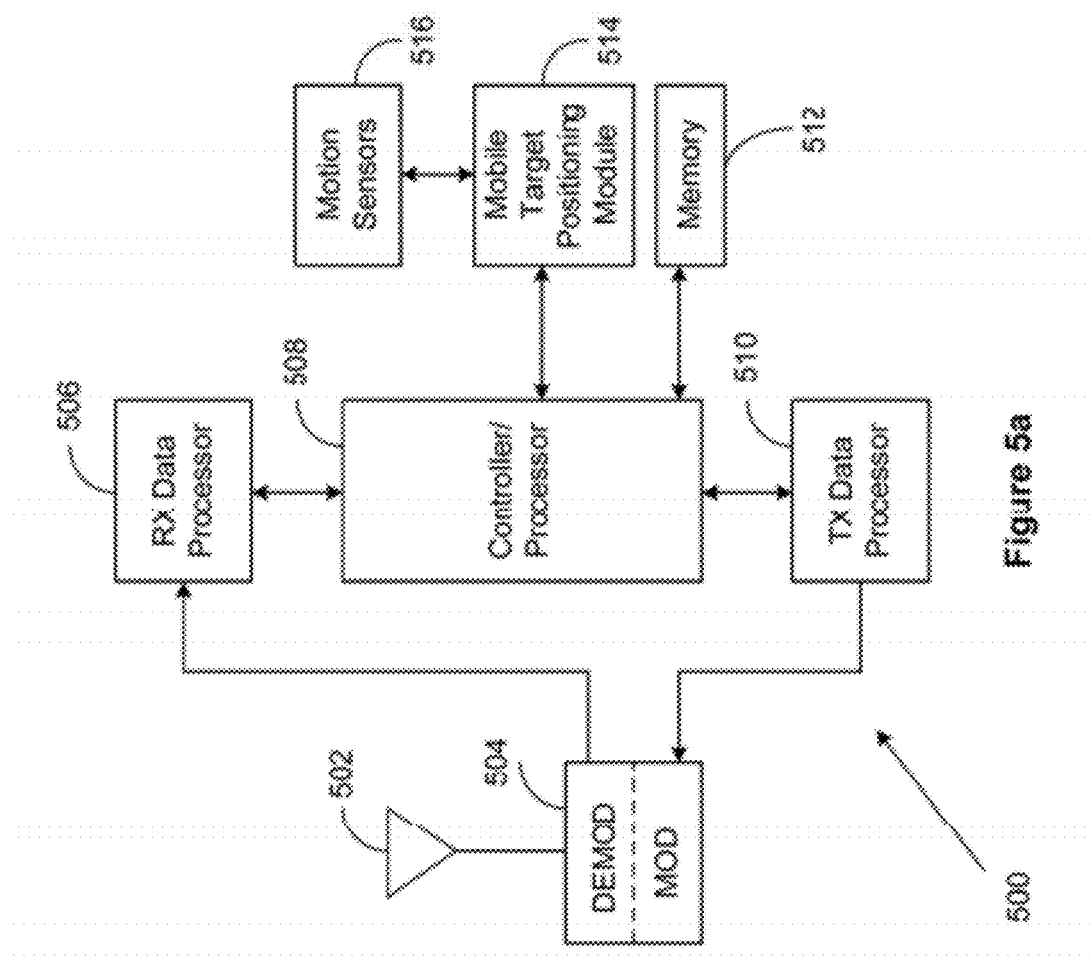

TARGET POSITIONING WITHIN A MOBILE STRUCTURE

CROSS REFERENCE TO RELATED APPLICATIONS

This application claims the benefit of U.S. provisional application No. 61/429,337, "Location Support For Mobile Structures" filed Jan. 3, 2011. The aforementioned United States application is hereby incorporated by reference in its entirety.

FIELD

The present disclosure relates to the field of wireless communications. In particular, the present disclosure relates to method and system for target positioning within a mobile structure.

BACKGROUND

Mobile devices have been widely used for communication among people. It is common for people to use cellular phones, personal digital assistants, and other wireless devices on a mobile structure, such as a moving vehicle, train, ship or ferry. To support these applications, conventional systems provide either absolute coordinates of the mobile devices (e.g. latitude and longitude) or coordinates relative to some fixed reference point (e.g. a point associated with some fixture on the ground) whose absolute location is or can be known. Such absolute or relative coordinates are not always useful for specifying location of a mobile device relative to a mobile structure that the mobile device is on or within because the location and orientation of the mobile structure may not be known, or if known, may change. In some situations, for example if one is trying to locate the user of a mobile device on a moving cruise ship or train, the absolute position of the mobile device or the position relative to some fixed reference point may not be as useful as the relative position of the mobile device with respect to the moving cruise ship or train.

Therefore, there is a need for systems and methods that can address the above issues of the conventional systems.

SUMMARY

Method and system for determining position of a target device relative to a mobile structure are disclosed. In one embodiment, the method includes obtaining measurements by the target device with respect to a plurality of radio beacons, determining whether the target device is on the mobile structure using the measurements, and determining location of the target device relative to the mobile structure using the measurements. The mobile structure includes at least one of a ship, a plane, a train, a vehicle, a submarine, a mobile home, a mobile office, a space craft, a space station, and an oil drilling platform.

The plurality of radio beacons include one or more mobile radio beacons on the mobile structure, and where the one or more mobile radio beacons include at least one of a base station, femtocell, Bluetooth node and a wireless local area network access point. The location is determined using at least one measurement of signal strength, signal quality and signal timing in a local coordinate system of the mobile structure obtained by the target device of the one or more mobile radio beacons.

The plurality of radio beacons further includes at least one of a fixed radio beacon and a GNSS satellite. The method includes determining an absolute location of the target device in absolute coordinates from the measurements using the at least one of a fixed radio beacon and a GNSS satellite, and converting the absolute location to a relative location using the absolute location and orientation of the mobile structure.

The method of determining whether the target device is on the mobile structure includes at least one of: comparing motion of target device with motion of mobile structure, detecting one or more mobile radio beacons on the mobile structure from the target device over a period of time, comparing velocity and location of the target device with respect to velocity and location of the mobile structure, comparing measurements obtained by target device from the plurality of radio beacons, and comparing locations obtained by target device from the plurality of radio beacons.

The method of comparing measurements obtained by target device from the plurality of radio beacons includes comparing whether measurements obtained by the target device with respect to one or more mobile radio beacons remain substantially unchanged, and comparing whether measurements obtained by the target device with respect to one or more fixed radio beacons have changed. The method of comparing locations obtained by target device from the plurality of radio beacons includes comparing whether relative location of the target device with respect to the one or more mobile radio beacons remains substantially unchanged, and comparing whether absolute location of the target device with respect to the one or more fixed radio beacons has changed.

The method of determining location of the target device includes determining location of the target device using X,Y,Z coordinates for the mobile structure. The method further includes communicating location information between the target device and a location server using a positioning protocol, where the positioning protocol includes at least one of 3GPP LTE Positioning Protocol (LPP) and OMA LPP Extensions (LPPe), and where the location information includes at least one of the obtained measurements and the determined location of the target device. The location information includes assistance data configured to assist the target device to obtain the measurements, where the assistance data includes at least one of information of the mobile structure and information of a mobile reference point. The information of the mobile structure identifies one or more mobile radio beacons or network cells supported by the one or more mobile radio beacons.

In another embodiment, a location server for determining position of a target device includes one or more processors, a target device positioning module configured to work with the one or more processors, and a memory configured to store the location of the target device relative to the mobile structure. The target positioning module include logic for obtaining measurements by the target device with respect to a plurality of radio beacons, logic for determining whether the target device is on the mobile structure using the measurements, and logic for determining location of the target device relative to the mobile structure using the measurements.

In yet another embodiment, an apparatus for determining position of a target device includes one or more processors, a mobile target positioning module configured to work with the one or more processors, and a memory configured to store the location of the target device relative to the mobile structure. The mobile target positioning module include means for obtaining measurements by the target device with respect to a plurality of radio beacons, means for determining whether the target device is on the mobile structure using the measurements, and means for determining location of the target device relative to the mobile structure using the measurements.

In yet another embodiment, a computer program product for determining position of a target device includes a non-transitory medium storing computer programs for execution by one or more computer systems. The computer program product further includes code for obtaining measurements by the target device with respect to a plurality of radio beacons, code for determining whether the target device is on the mobile structure using the measurements, and code for determining location of the target device relative to the mobile structure using the measurements.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 3 illustrates a method of determining orientations of a mobile structure according to some aspects of the present disclosure.

FIGS. 4a-4e illustrate methods of using Euler angles and Tait-Bryan angles to describe orientations of a mobile structure according to some aspects of the present disclosure.

FIG. 5a illustrates a block diagram of an apparatus for determining position of a target device with respect to a mobile structure according to some aspects of the present disclosure.

DESCRIPTION OF EMBODIMENTS

The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Figure 1:
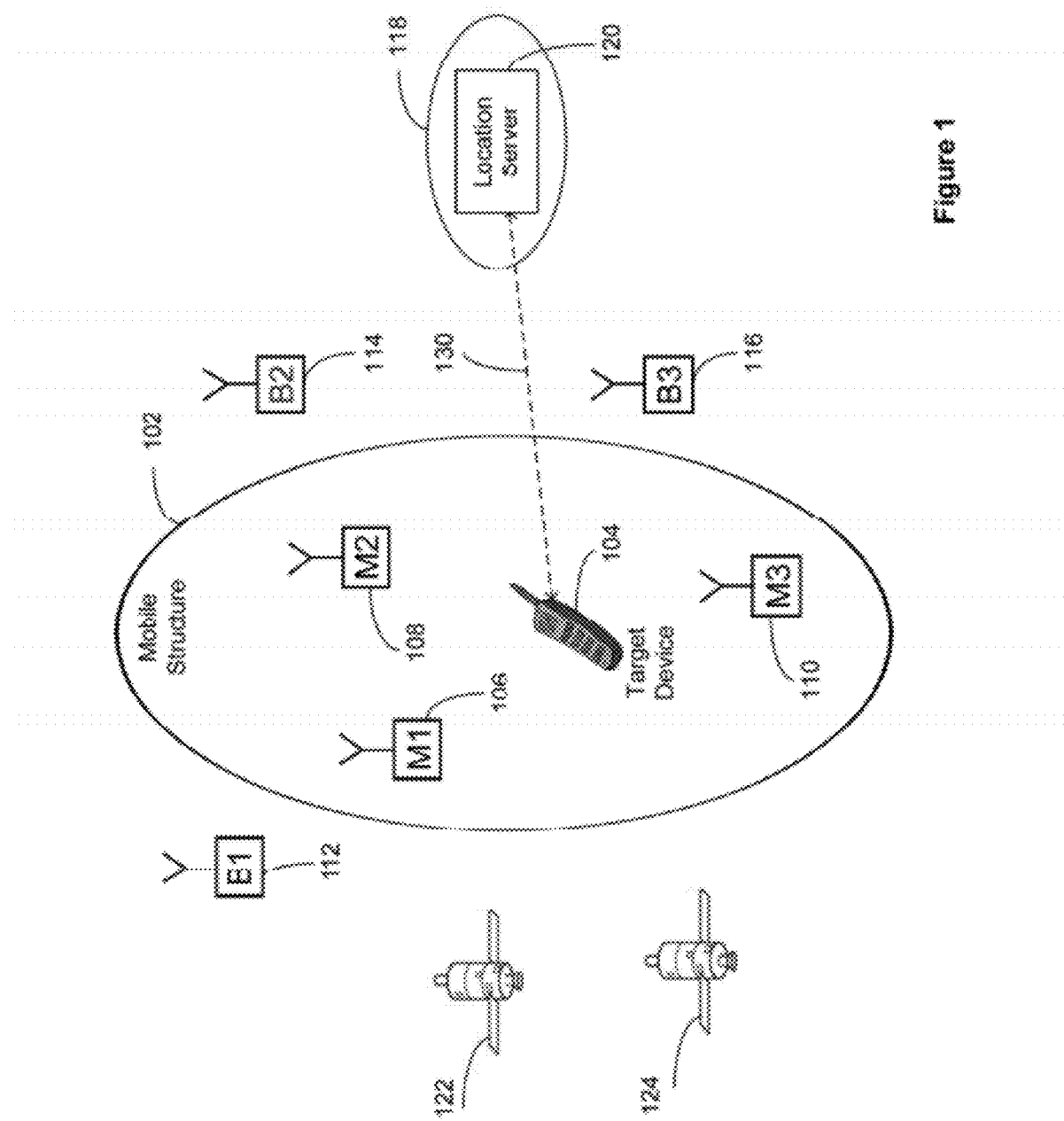
FIG. 1 illustrates an exemplary application of determining position of a target device within a mobile structure according to some aspects of the present disclosure.

FIG. 1 illustrates an exemplary application of determining position of a target device within a mobile structure according to some aspects of the present disclosure. The terms position, location and location estimate are synonymous and are used interchangeably herein. In this example, a mobile structure 102 represents at least one of the following which at any time may be moving or stationary: a ship, a submarine, a plane, a train, a vehicle, a space craft, a space station, a mobile home, a mobile office and an oil drilling platform. A target device 104, also referred to as a mobile target device, may be used on the mobile structure 102. According to embodiments of the present disclosure, the target device 104 can include, but not limited to, a cellular or other wireless communication device (e.g. a cell phone, a smart phone), personal communication system device, personal navigation device, personal information manager, personal digital assistant, laptop or other suitable mobile device which is capable of receiving wireless communication and/or navigation signals. Target device 104 may be referred to as a User Equipment (UE), a Mobile Station (MS), a Mobile Device, a Mobile Terminal, or by some other name. According to embodiments of the present disclosure, when the target device 104 is referred to be on the mobile structure, it also includes situations when the target device 104 is within the mobile structure 102 and vice versa.

In this exemplary application, there are one or more mobile radio beacons M1, M2, and M3, denoted as 106, 108, and 110 respectively, attached to the mobile structure 102. The one or more mobile radio beacons can act as mobile reference points on the mobile structure 102. In some situations, there may be one or more fixed radio beacons B1, B2, and B3, denoted as 112, 114, and 116 respectively, located near the mobile structure 102. According to embodiments of the present disclosure, the mobile radio beacons and the fixed radio beacons can be any combinations of base stations, femtocells, Bluetooth nodes, home base stations and wireless local area network (WLAN) access points (APs). The mobile and fixed radio beacons may support wireless communication according to (i) the Global System for Mobile Communications (GSM), Wideband Code Division Multiple Access (WCDMA) or Long Term Evolution (LTE) standards defined by the $3^{rd}$ Generation Partnership Project (3GPP); (ii) the Code Division Multiple Access (CDMA) 1x RTT and EvDO standards defined by the $3^{rd}$ Generation Partnership Project 2 (3GPP2); (iii) the 802.11 WiFi or 802.16 WiMax standards defined by IEEE; or (iv) some other standard. The target device 104 can be configured to measure signals, such as signal strength, signal quality, timing and timing differences, from both the mobile radio beacons and the fixed radio beacons. Target device 104 may also be configured to measure signals from satellites 122 and 124 that may be part of a Global Navigation Satellite System (GNSS) such as the United States Global Positioning System (GPS), the Russian Glonass system or the European Galileo system. Note that in some applications, the target device 104 may be located outside the mobile structure 102.

Target device 104 may be in communication with a location server 120 that is part of or attached to a network 118. Location server 120 may be a Serving Mobile Location Center (SMLC), a Standalone SMLC (SAS) or an Enhanced Serving Mobile Location Center (E-SMLC) as defined by 3GPP. Location server 120 may also be a Secure User Plane Location (SUPL) Location Platform (SLP) defined by the Open Mobile Alliance (OMA) or a Position Determining Entity (PDE) defined by 3GPP2. Location server 120 may provide assistance data to target device 104—e.g. assistance data to (i) help target device 104 acquire and measure signals from the mobile radio beacons 106, 108, 110, the fixed radio beacons 112, 114, 116 and/or satellites 122, 124 and assistance data to (ii) help target device 104 compute its location from these measurements. Location server 120 may also request measurements or a location estimate from target device 104. Target device 104 and location server 120 may employ positioning protocol 130 to communicate location related information such as conveying assistance data from location server 120 to target device 104 or conveying measurements or a location estimate from target device 104 to location server 120. Examples of positioning protocol 130 may be (i) the LTE Positioning Protocol (LPP) defined by 3GPP in 3GPP Technical Specification (TS) 36.355 or (ii) the LPP Extensions (LPPe) protocol defined by OMA in OMA TS OMA-TS-LPPe-V1_0 or (iii) both LPP and LPPe combined. Location server 120 may include a database with information on satellites 122, 124 (e.g. orbital and timing data), on mobile radio beacons 106, 108, 110 and fixed radio beacons 112, 114, 116 (e.g. absolute location coordinates of fixed radio beacons, location coordinates of mobile radio beacons relative to mobile structure 102, antenna characteristics, transmission power, transmission timing relative to other radio beacons or relative to satellites 122, 124). Location server 120 may be configured to provide some of this information to target device 104 as assistance data using positioning protocol 130—e.g. on request by target device 104 or when location server 120 needs to obtain the location of target device 104 on behalf of some external client (not shown in FIG. 1). Location server 120 and target device 104 may use positioning protocol 130 as part of a control plane solution for determining location or as part of a user plane location solution. In a control plane solution, signaling such as that conveyed by positioning protocol 130 is conveyed using protocols and interfaces supported by a network (e.g. network 118) that are defined to support signaling rather than data or voice traffic. In a user plane solution, signaling such as that conveyed by positioning protocol 130 is conveyed by protocols and resources intended to convey data and voice traffic. Examples of a control plane location solution are the 3GPP solutions defined in 3GPP TSs 23.271, 43.059, 25.305 and 36.305. An example of a user plane solution is the SUPL solution defined by OMA.

Network 118 may be a wireless network and support GSM, WCDMA, LTE, CDMA 1x RTT, CDMA EvDO, WiFi, WiMax or some other wireless technology. Network 118 may also be a wireline network (e.g. support DSL or packet cable access). Some or all of mobile radio beacons 106, 108, 110 and fixed radio beacons 112, 114, 116 may be part of network 118 or part of some other network not shown in FIG. 1 and may be capable of communicating with location server 120—e.g. in order to update information concerning them (e.g. transmission timing, transmission power) stored by location server 120. In the case when mobile radio beacons 106, 108, 110 are part of network 118, backhaul signaling and data/voice transport with the rest of network 118 may be accomplished by wireless means (e.g. microwave, satellite as well as the wireless technology supported by fixed base stations belonging to network 118).

Target device 104 may access location server 120 via base stations, home base stations or WLAN APs belonging to network 118 or belonging to some other network (not shown in FIG. 1). These base stations, home base stations and WLAN APs may or may not include mobile radio beacons 106, 108, 110 and fixed radio beacons 112, 114, 116.

According to embodiments of the present disclosure, a system can be configured to determine position of the target device 104 while the mobile structure 102 is stationary or moving according to the following conditions. In one approach, the position of the target device can be determined using measurements made by the target device 104 of the radio signals transmitted from the mobile radio beacons M1, M2, and M3. The measurements may include signal strength, signal quality or signal timing including absolute timing and relative timing of one mobile radio beacon versus another. The target device 104 may compute a location estimate from these measurements or provide the measurements to location server 120 to compute a location estimate (e.g. using positioning protocol 130). Whichever entity computes the location estimate may make use of location coordinates (e.g. X,Y,Z coordinates) defined relative to mobile structure 102 as described further on herein. As location coordinates relative to mobile structure 102 do not change when mobile structure 102 changes its location or orientation, the resulting location of target device 104 (relative to mobile structure 102) can be independent of the location and orientation of mobile structure 102 and any movement of mobile structure 102. Existing terrestrial based position methods may then be used to determine the location of target device 104—e.g. the Observed Time Difference of Arrival (OTDOA) position method defined by 3GPP for LTE and WCDMA radio access, the Advanced Forward Link Trilateration (AFLT) method defined by 3GPP2 for CDMA 1x and EvDO radio access, and the Enhanced Cell ID (ECID) method defined by 3GPP and OMA for various wireless access types. Target device 104 may also employ sensors to detect change of location relative to mobile structure 102 when mobile structure 102 is stationary or moving. Target device 104 or location server 120 may make use of these sensor measurements to determine a new location for target device 104 based on a previous known location—e.g. from measurements of mobile radio beacons M1, M2 and M3. If mobile structure 102 is moving, sensors associated with target device 104 may be used to distinguish motion of target device 104 from motion of mobile structure 102—e.g. distinguish the speed and direction of the user of target device 104 walking on a ship from the speed and direction of the ship itself.

In addition, the position of the target device 104 may also be determined in absolute coordinates using measurements made by target device 104 of radio signals from the fixed radio beacons B1, B2, and B3 and/or satellites 122, 124. In order to determine the location of target device 104 relative to mobile structure 102 in this case, the absolute location and orientation (e.g. defined by 3 Euler angles as described later herein) of mobile structure 102 may be combined with the absolute location of target device 104 obtained at the same or nearly the same time. This may be supported by location server 120—e.g. if location server 120 can obtain the positions of mobile radio beacons M1, M2 and M3 at approximately the same time as the absolute location of target device 104.

Target device 104 or location server 120 may be configured to determine the location of target device 104 from (i) measurements of mobile radio beacons M1, M2, M3 combined with (ii) measurements of fixed radio beacons B1, B2 and B3 and/or GNSS satellites 122, 124 since the measurements in (i) are associated with location relative to mobile structure 102 which may be moving whereas the measurements in (ii) are associated with absolute location.

Positioning a target device 104 relative to a mobile structure 102 may be simplified by using measurements of mobile radio beacons M1, M2, M3 as opposed to using fixed radio beacons B1, B2, B3 and/or GNSS satellites 122, 124, because it may then be unnecessary to determine the current location and orientation of mobile structure 102. In addition, the resulting location of target device 104 relative to mobile structure 102 may be meaningful if target device 104 is on or within mobile structure 102 and not just nearby. These observations mean there may be an advantage in knowing in advance that target device 104 is on or within mobile structure 102.

A target device may be determined to be on or within a mobile structure 102 when one or more of the conditions shown in Table 1 can be verified.

TABLE 1

Schemes for Determining that a Target Device 104 is on or within a Mobile Structure 102

| Condition | Description |
|---|---|
| A | Motion sensors within target device 104 determine motion of target device 104 to be consistent with (e.g. the same as) the motion of mobile structure 102 which is determined to be moving (e.g. from positioning of or sensor measurements from mobile radio beacons M1, M2 or M3). |
| B | Target device 104 continuously detects over a period of time nearby mobile radio beacons M1, M2, M3 or other target devices known to be attached to (on or inside) the mobile structure 102, which is determined to be moving (e.g. from positioning of or sensor measurements from mobile radio beacons M1, M2 or M3). |
| C | Absolute location and absolute velocity of target device 104 (e.g. as obtained from measurements by target device 104 of fixed radio beacons B1, B2, B3 and/or GNSS satellites 122, 124) match that of either (i) the mobile structure 102, which is determined to be moving (e.g. from positioning of or sensor measurements from mobile radio beacons M1, M2 or M3), or (ii) other target devices already determined to be on or inside the mobile structure 102 which is determined to be moving. |
| D | Target device 104 compares measurements or locations obtained from fixed radio beacons versus mobile radio beacons as described further on herein and determines that target device 104 is moving relative to the fixed radio beacons and not moving relative to the mobile radio beacons. |

Condition D in Table 1 may be verified in several ways. In one way, the location of target device 104 may be determined periodically relative to mobile structure 102 (e.g. using X,Y,Z coordinates as described later herein) using signals measurements from mobile radio beacons M1, M2, M3. If this relative location is found to be substantially constant (i.e. X,Y,Z coordinates do not change or do not change much) and within the relative location boundaries of mobile structure 102, it may be derived that target device is on or near to mobile structure 102 and not moving relative to mobile structure 102. If the location of target device 104 is also determined periodically in absolute coordinates using signal measurements from fixed radio beacons B1, B2, B3 or GNSS satellites 122, 124 and is found to be changing, it may be derived that target device 104 is moving. The combination of an almost fixed relative location and a changing absolute location may be used to derive that target device 104 and mobile structure 102 share the same motion which may indicate that target device 104 is on or within mobile structure 102.

Condition D in Table 1 may also be verified if signal measurements for the mobile radio beacons M1, M2, M3 made by target device 104 remain substantially constant—for example, if signal timing differences between pairs of mobile radio beacons and/or signal strengths do not change or do not change much. If, in addition, signal measurements made by target device 104 for fixed radio beacons B1, B2, B3 etc. are found to be changing, then it may be derived that target devoice 104 is moving absolutely but is not moving relative to mobile structure 102 which may indicate that target device 104 is on or within mobile structure 102. To further verify this, the relative location of target device 104 may be obtained using measurements from mobile radio beacons M1. M2 and M3 and verified to be within the relative location confines or boundaries of mobile structure 102.

Although condition D in Table 1 may be verified when mobile structure 102 is moving, it does not require the location, velocity or orientation of mobile structure 102 to be obtained nor does it require explicit verification that mobile structure 102 is moving. Condition D may thus be simpler to verify than other conditions.

It will be appreciated by those versed in the art that Conditions B, C and D in Table 1 may be verified in a symmetric manner using measurements by mobile radio beacons M1, M2 and M3 and/or by fixed radio beacons B1, B2 and B3 of signal transmission from target device 104. Thus, for example, as an alternative means of verifying condition B, one or more mobile radio beacons M1, M2 and M3 may detect signals from target device 104 over a period of time and may determine, or provide measurements to location server 120 to enable location server 120 to determine, that mobile structure 102 is moving while signals from target device 104 are detected. As an alternative means of verifying condition C, one or more fixed radio beacons B1, B2 and B3 may measure signals from target device 104 (e.g. signal timing, signal quality and signal strength) and determine, or provide the measurements to location server 120 to enable location server 120 to determine, the absolute location and/or absolute velocity of target device 104 which may then be compared and found to substantially correspond to the absolute location and/or absolute velocity of mobile structure 102. As an alternative means of verifying condition D, one or more mobile radio beacons M1, M2 and M3 may measure signals from target device 104 (e.g. signal timing and signal strength) and verify that the measurements are not changing or not substantially changing whereas one or more fixed radio beacons B1, B2 and B3 may measure signals (e.g. the same signals) from target device 104 and verify that the measurements are substantially changing. Conditions B, C and D verified in the above manner may be used to determine that target device 104 is on or within mobile structure 102.

Figure 2C:
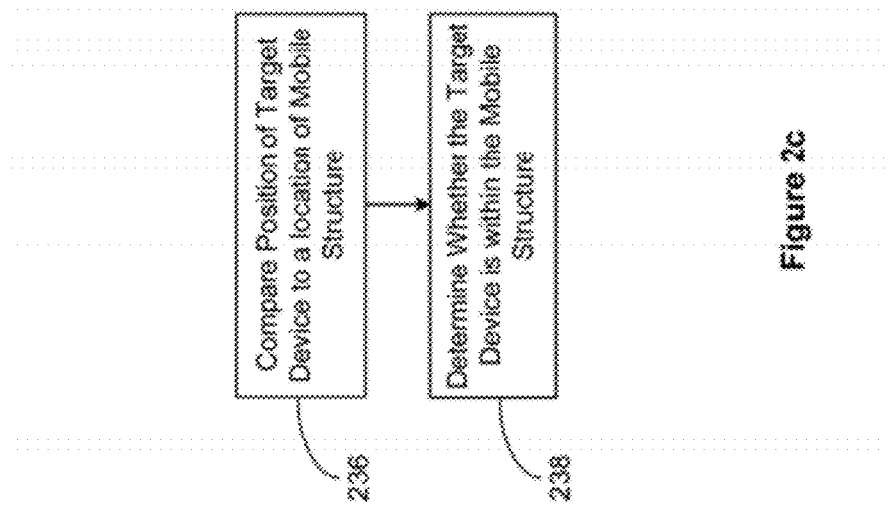
FIGS. 2b-2c illustrate methods of determining whether a target device is within a mobile structure according to some aspects of the present disclosure.
Figure 2B:
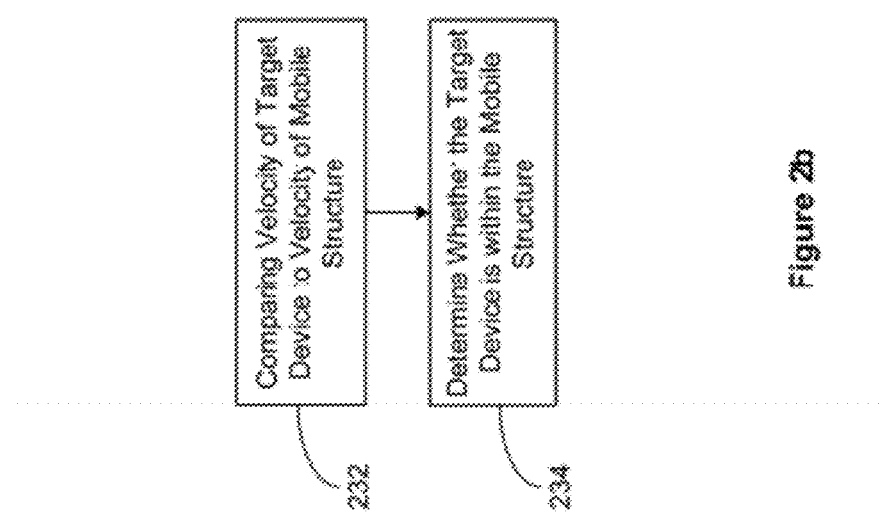
Figure 2A:
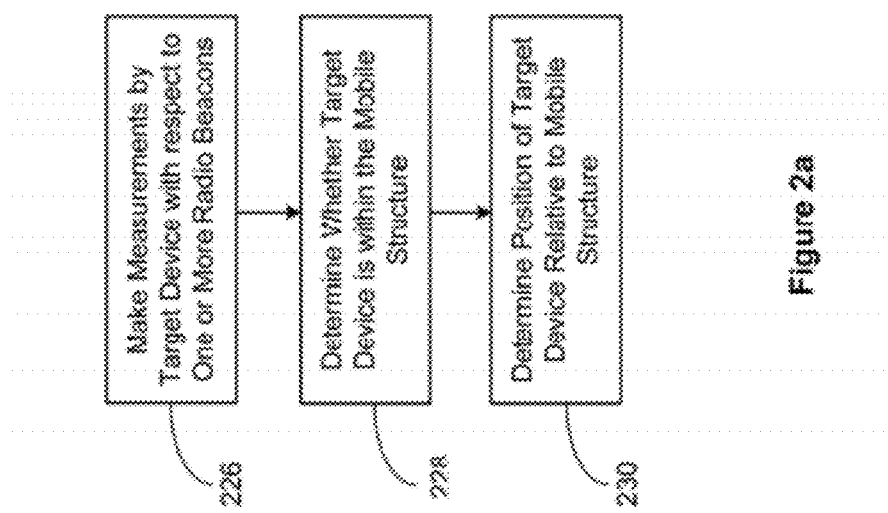
FIG. 2a illustrates a method of determining position of a target device within a mobile structure according to some aspects of the present disclosure.

FIG. 2a illustrates a method of determining position of a target device within a mobile structure according to some aspects of the present disclosure. As shown in the example of FIG. 2a, in block 226, the target device (e.g. target device 104) makes measurements (e.g. of signal strength, signal quality or signal timing) of radio signals from radio beacons—e.g. mobile radio beacons M1, M2, M3, or fixed radio beacons B1, B2, B3 or GNSS satellites 122, 124 or some combination thereof and/or makes measurements of internal motion sensors. In block 228, the method determines whether the target device is on or within the mobile structure (e.g. mobile structure 102). This may be determined if one or more of the conditions A, B, C and D in Table 1 are verified or using the methods described below associated with FIGS. 2b and 2c. In block 230, the method determines the position of the target device relative to the mobile structure using the measurements obtained in block 226—e.g. as described above herein in association with FIG. 1.

FIGS. 2b-2c illustrate methods of determining whether a target device is within a mobile structure according to some aspects of the present disclosure. As shown in FIG. 2b, in block 232, the method compares velocity of the target device to velocity of the mobile structure. In block 234, based on the comparison, the method determines whether the target device is within the mobile structure. For example, the velocity of the target device may be substantially the same as the velocity of the mobile structure which can indicate that the target device may be on or within the mobile structure. The method may also use the position of the target device to determine whether the target device may be on or within the mobile structure. In the example shown in FIG. 2c, in block 236, the method compares position of the target device to a particular location of the mobile structure. In block 238, based on the comparison, the method determines whether the target device is within the mobile device. For example, if the two positions are the same or nearly the same, the target device may be on or within the mobile structure. By verifying both a velocity match in block 234 and a position match in block 238, the method may determine that the target device is on or within the mobile structure. Conditions A and C in Table 1 are variants of the methods in FIGS. 2b and 2c.

Figure 2E:
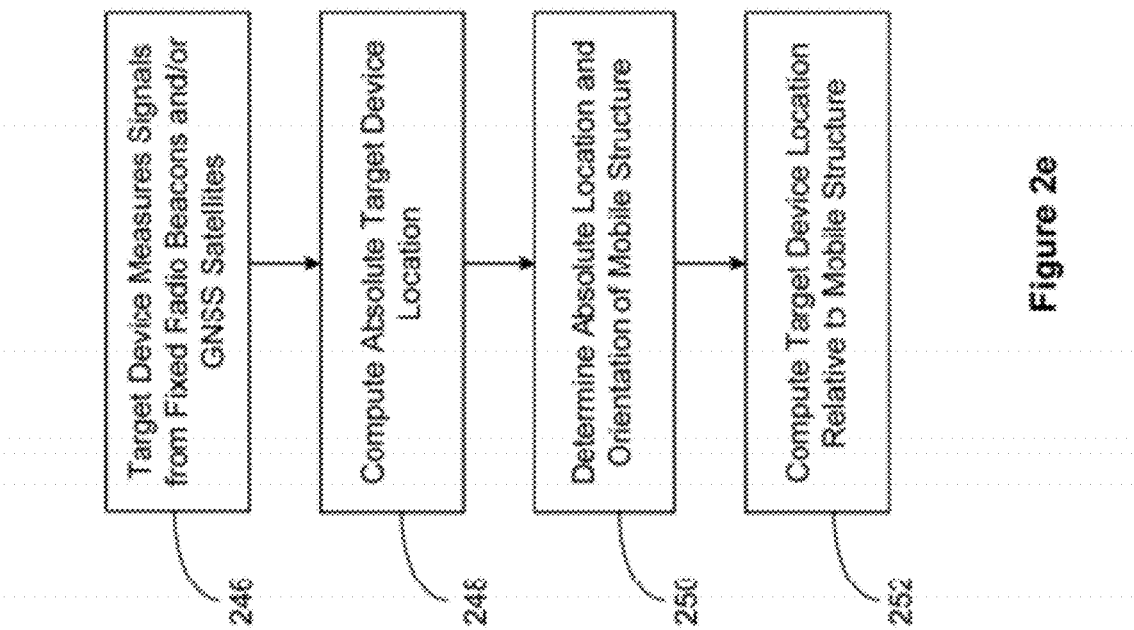
FIG. 2d-2e illustrate methods of determining position of target device relative to mobile structure according to some aspects of the present disclosure.
Figure 2D:
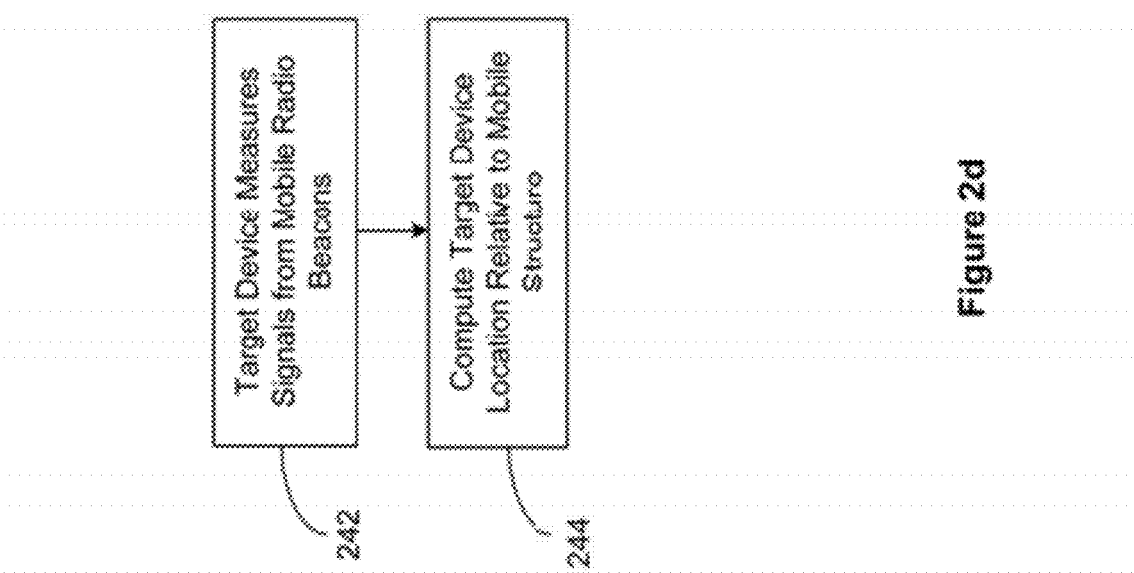

FIGS. 2d-2e illustrate methods of determining position of target device relative to mobile structure according to some aspects of the present disclosure. In block 242 of FIG. 2d, the target device (e.g. target device 104) measures signals from mobile radio beacons fixed to the mobile structure (for example, beacons M1, M2 and M3 in FIG. 1). The measurements may include signal strength, signal quality and signal timing. In block 244, the method generates relative location coordinates (e.g. X, Y and Z coordinates described further on herein) of the target device within the mobile structure (e.g. mobile structure 102) using the measurements of the mobile radio beacons and the relative locations of the mobile radio beacons on the mobile structure.

In another exemplary approach shown in FIG. 2e, in block 246, the target device measures signals from fixed radio beacons (e.g. beacons B1, B2 and B3 in FIG. 1) and/or from GNSS satellites (e.g. satellites 122, 124 in FIG. 1). In block 248, the method obtains the absolute location of the target device from these measurements. In block 250, the method determines the absolute location and orientation (e.g. as defined by 3 Euler angles) of the mobile structure—e.g. using measurements made by mobile radio beacons (e.g. M1, M2, M3) on the mobile structure of (i) fixed radio beacons (e.g. B1, B2, B3 in FIG. 1) and/or (ii) GNSS satellites (e.g. satellites 122, 124 in FIG. 1). In block 252, the method generates location coordinates of the target device with respect to the mobile structure using the absolute location of the target device computed in block 248 and the absolute location and orientation of the mobile structure obtained in block 250.

According to embodiments of the present disclosure, the position of the target device 104 can be determined in absolute terms or in relative terms with respect to the mobile structure 102. In one approach, a relative position of the target device 104 can be determined as follows. The method makes use of relative location measurements (RLMs) to produce a relative location estimate (for example using X,Y,Z coordinates). RLMs can be obtained from terrestrial position methods using measurements made by a target device 104 of signals from mobile radio beacons M1, M2, and M3 attached to the mobile structure. Motion sensors within target device 104 can provide RLMs containing information about the motion of target device 104 relative to the mobile structure 102. For example, motion sensors may determine the distance and direction travelled by target device 104 over a period of time on or within mobile structure 102 (e.g. the distance and direction travelled by the user of target device 104 who is walking on a moving or stationary train or ship). The distance and direction of travel may be used to determine a new location relative to the mobile structure given an initially known relative location. When the mobile structure is moving, the motion sensors may be configured to distinguish between motions of the target device relative to the mobile structure from the motion of the mobile structure itself. This may be accomplished by noting that the two types of motion have different acceleration characteristics—e.g. low and sustained acceleration over a limited period for a ship or train versus highly variable acceleration over a long period for a user who is walking.

In another approach, an absolute position of the target device 104 can be determined as follows. The method makes use of absolute location measurements (ALMs) to produce an absolute (latitude/longitude) location estimate. ALMs can be obtained from an assisted global navigation satellite system (A-GNSS) and terrestrial position methods such as the OTDOA method defined by 3GPP for LTE and WCDMA wireless access or the ECID method defined by 3GPP and OMA for many different wireless access types that make use of measurements of fixed radio beacons. Motion sensors can also provide ALMs with motion measurements of the combined target device 104 and mobile structure 102. In other approaches, either or both of the relative and absolute positioning methods can be used to derive the relative and/or absolute location of a target device 104 on or within the mobile structure 102.

According to embodiments of the present disclosure, a Cartesian coordinate system may be employed to describe the coordinates, such as the X, Y, and Z coordinates, of any location (e.g. the location of a target device) relative to a mobile structure. In the case of a mobile structure that is a vehicle, the coordinate system may follow a default convention. For example, the following default axes can be used for a vehicle: 1) align the X axis to the normal horizontal direction of travel of the vehicle; 2) align the Y axis to be perpendicular to the X axis and horizontal when the vehicle is in a normal travelling position (e.g. standing on all 4 wheels on a level road in the case of a car or van); and 3) align the Z axis to be perpendicular to the X and Y axis (which will be vertical when the vehicle is in a normal travelling position. A particular reference point within the moving vehicle can be used as the origin. Note that the origin may be defined using a textual description (e.g. may be defined as "the center of the stern railing on Deck Y" on a ship) or may be a mathematically unique point, such as the center of gravity of the vehicle when emptied of all extraneous cargo, artifacts and people.

FIG. 3 illustrates an example of using default X, Y, Z axes to define coordinates of a moving aircraft 302. In particular, this example makes use of typical principal direction of motion and horizontal transverse symmetry. For example, the X axis 304 represents heading, longitudinal axis, or roll axis of a moving aircraft 302; the Y axis 306 represents transverse or lateral axis, or pitch axis of the moving aircraft 302; and the Z axis 308 represents vertical axis, or yaw axis of the moving aircraft 302. The origin can be specified to be a point within the aircraft or may use a default point, such as the center of gravity of the aircraft 302.

Note that locations within the context of a mobile structure can be expressed using the X, Y, Z coordinates. In one approach, the X,Y,Z coordinates may be provided relative to the origin. In another approach, the difference between the X,Y,Z coordinates of a location L1 and the X,Y,Z coordinates of a second location L2 may be provided to give the location of L1 relative to L2 (or vice versa). In yet another approach, conversion between relative X,Y,Z coordinates and absolute coordinates (e.g. latitude, longitude, altitude) may be accomplished by using a location of known X, Y, Z coordinates within the mobile structure (such as the origin), and a three dimensional orientation of the mobile structure. In some applications, mobile structures typically change orientation only in a horizontal plane, such as a moving car, bus, or train. In other applications, there may be situations where orientation changes in all three dimensions, such as when a plane is taking off or landing, or when a ship is sailing in a rough sea, or when a vehicle is climbing or descending a steep hill.

Figure 4B:
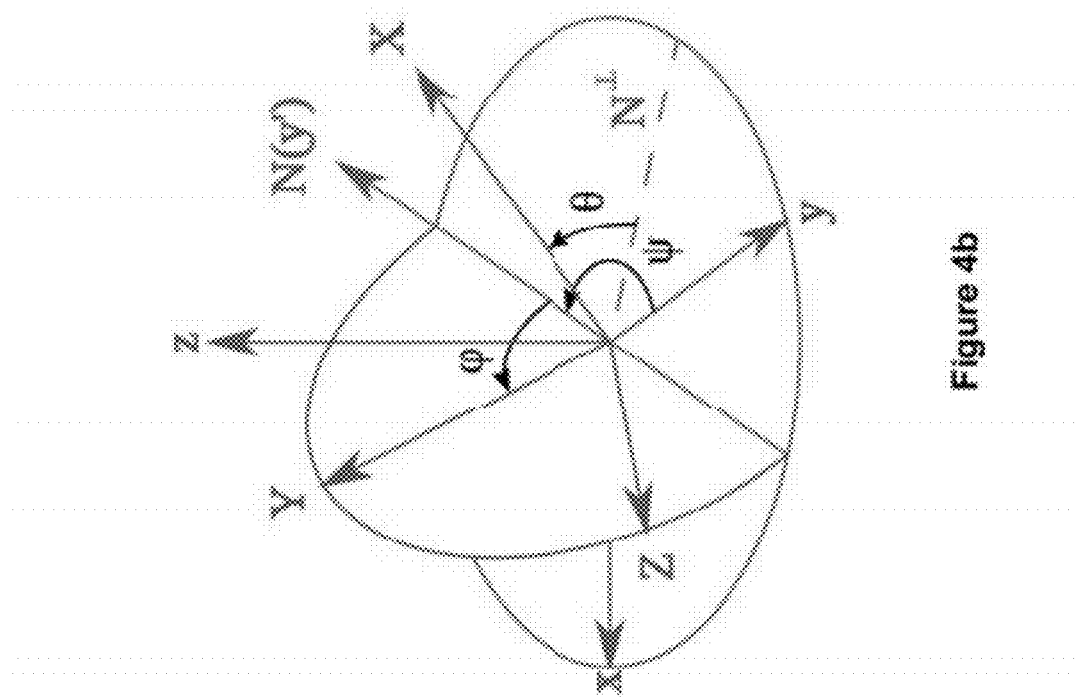
Figure 4A:
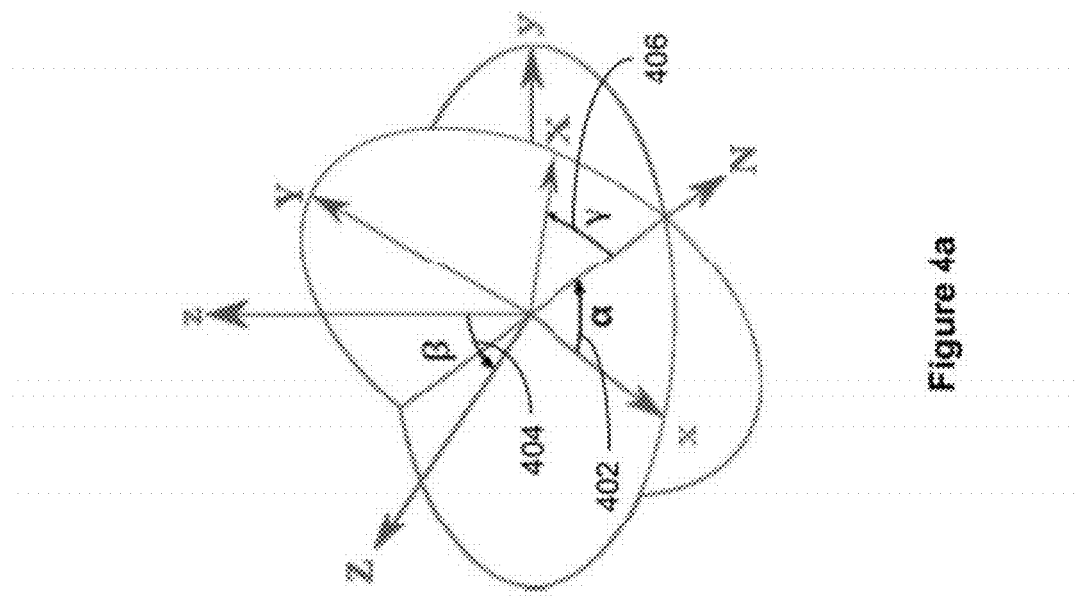

FIG. 4a illustrates a method of using Euler angles to describe orientations of a mobile structure according to some aspects of the present disclosure. According to embodiments of the present invention, three-dimensional orientation can be expressed using Euler angles.

Euler angles can be used as means of representing the spatial orientation of any frame (coordinate system) as a composition of rotations from a frame of reference (coordinate system). Euler angles represent three composed rotations that move a reference frame to a given referred frame. With Euler angles, any orientation can be achieved by composing three elemental rotations (rotations around a single axis of a basis), and any rotation matrix can be decomposed as a product of three elemental rotation matrices.

By convention, Cartesian coordinates x, y, z (lower case) are commonly used to denote a fixed reference system (such as North, East, Vertical) and X, Y, Z (upper case) are used to denote coordinates anchored to a mobile structure. The x, y, z and X, Y, Z axes are assumed to be aligned when all three Euler angles are zero and to show some rotation of the X, Y, Z axes when they are not. As shown in FIG. 4a, rotation of the X, Y, Z axes to any new orientation can be accomplished as a sequence of three rotations performed one at a time through angles ($\alpha$, $\beta$, $\gamma$) about three axes denoted (a, b, c). That is, the X, Y, Z axes are first rotated through angle $\alpha$ 402 (commonly denoted positive when anticlockwise) about axis a, then rotated through angle $\beta$ 404 about axis b, and finally rotated through angle $\gamma$ 406 about axis c. For Euler angles, the axes of rotation (a, b, c) includes some combination of X, Y and Z where each rotation is performed about the current X, Y or Z axis at that stage in the rotational sequence. Note that proper Euler angles can have six combinations, namely (Z,X,Z), (Z,Y,Z), (X,Y,X), (X,Z,X), (Y,X,Y) and (Y,Z,Y), with one axis being used twice. Nautical or Tait-Bryan angles can also have six combinations that use 3 different axes, namely (X,Y,Z), (X,Z,Y), (Y,X,Z), (Y,Z,X), (Z.X,Y), and (Z,Y,X). Both types of angles produce an intermediate axis known as the line of nodes (N) that can be used to define the final orientation.

FIG. 4a is an example of orientation defined by a rotation using Proper Euler angles and includes the xyz (fixed) system, the XYZ (rotated) system following rotation through the 3 Euler angles and the line of nodes, labeled N. The rotation sequence in FIG. 4a is (Z,X,Z)—with the XY plane first rotated through an angle $\alpha$ 402 about the Z axis (which initially aligns with the fixed z axis), then with the new YZ plane rotated through an angle $\beta$ 404 about the new X axis (which also defines the line of nodes N) and finally with the new XY plane rotated through an angle $\gamma$ 406 about final Z axis. The line of nodes N is perpendicular to z and Z, is also at the intersection of the initial x,y and final X,Y planes and lies along the X axis after the first rotation is performed.

Figure 4D:
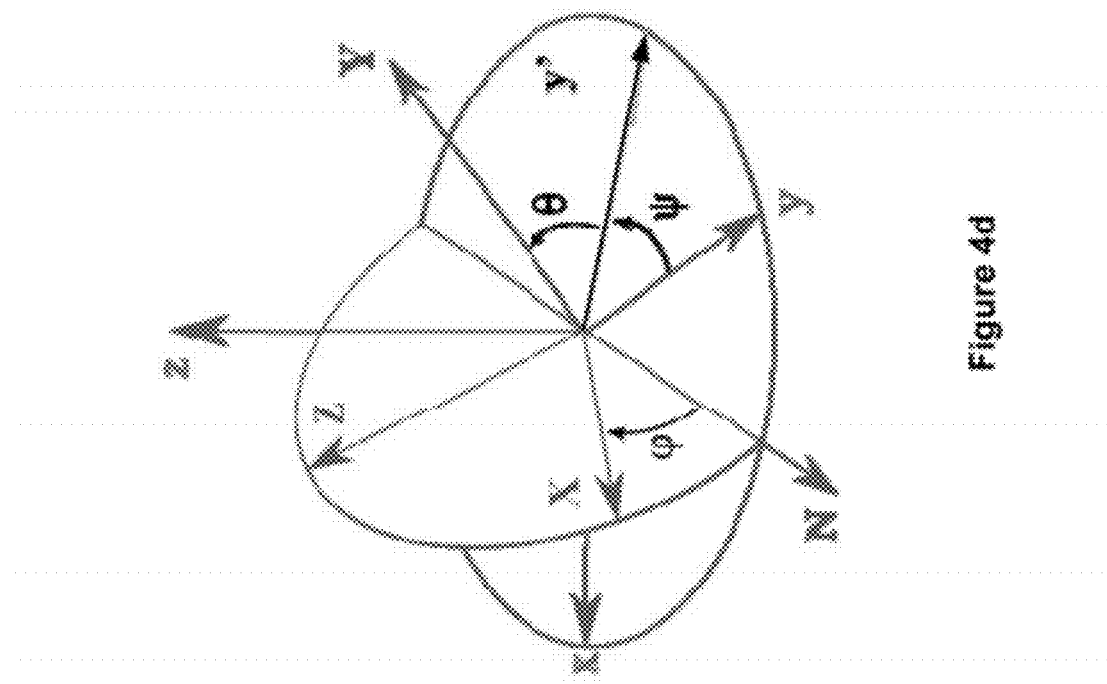
Figure 4C:
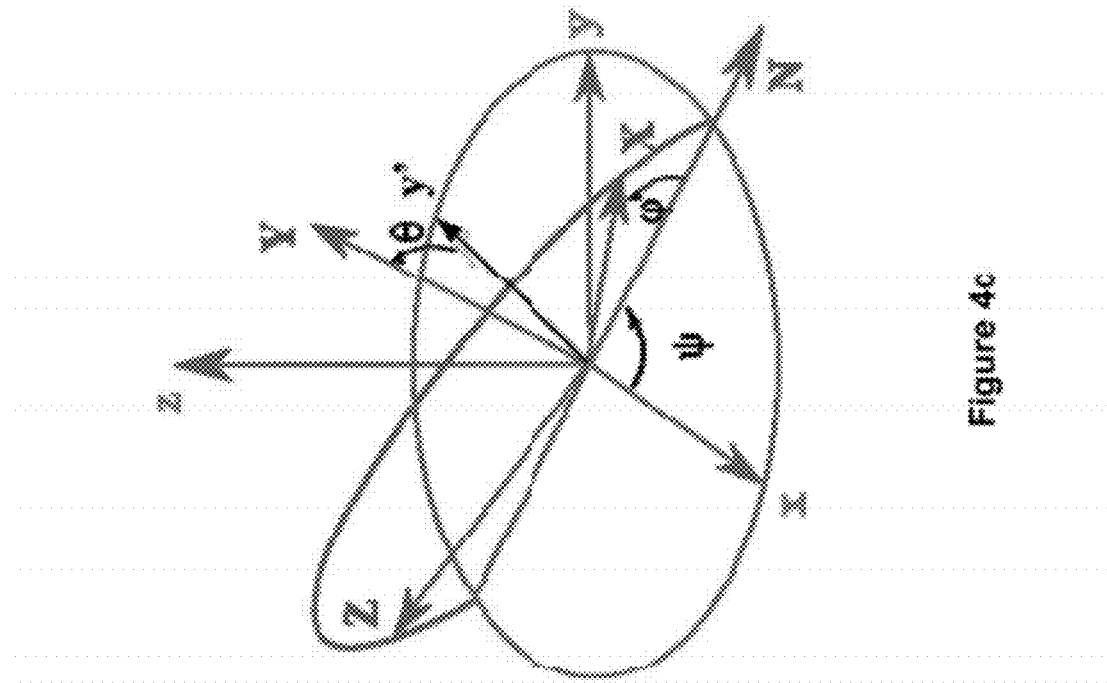

FIGS. 4b, 4c and 4d are examples of orientation defined by a rotation using Tait-Bryan angles and include the xyz (fixed) system, the XYZ (rotated) system following rotation through the 3 Euler angles and the line of nodes, labeled N. The rotation sequence in FIGS. 4c and 4d is (Z,X,Y)—with the XY plane first rotated through an angle w about the Z axis (which initially aligns with the fixed z axis), then with the new YZ plane rotated through an angle $\theta$ about the new X axis (which also defines the line of nodes N) and finally with the new ZX plane rotated through an angle $\phi$ about final Y axis. The line of nodes N is at the intersection of the initial x,y and final X,Z planes and also along the X axis after the first rotation. The rotation in FIG. 4b is (Z,Y,X) through the sequence of angles $\psi$, $\theta$ and $\phi$.

FIG. 4e illustrates an example of using default three dimensional coordinates from FIG. 3 to define orientation of a moving aircraft using Tait-Bryan angles. In this example, yaw, pitch and roll angles of a moving aircraft 412 are shown. Note that the fixed frame xyz has been moved backwards from the center of gravity (preserving angles) for clarity. Axes Y and Z are not shown. The rotation sequence (Z,Y,X) is used here which corresponds to the following sequence of rotations: 1) an initial rotation $\psi$ 414 about the vertical Z axis for heading or yaw; 2) a second rotation $\theta$ 416 about the new transverse Y axis for elevation or pitch; and 3) a final rotation $\phi$ 418 about the longitudinal X axis for bank or roll. The approach further includes taking the fixed x axis as pointing true North, the fixed y axis as true East, and the fixed z axis as vertically up.

Referring to FIG. 1, positioning of a target device 104 relative to a mobile structure 102 may be supported or assisted using the positioning protocol 130. For example, the location server 120 may use the positioning protocol 130 to request measurements of mobile radio beacons M1, M2 and M3 in FIG. 1 and/or measurements of fixed radio beacons B1, B2 and B3 in FIG. 1. Furthermore, location server 120 may provide assistance data to target device 104 to enable target device 104 to make measurements of mobile and/or fixed radio beacons and/or to compute a location estimate from such measurements. Location server 120 may also provide assistance data to target device 104 that includes certain information about mobile structure 102 to assist target device 104 to make measurements and/or compute its location relative to mobile structure 102 (e.g. using X,Y,Z coordinates). Table 2 shows information about mobile structure 102 that may be provided to target device 104 using positioning protocol 130.

TABLE 2

Mobile Structure 102 Information provided using Positioning Protocol 130 to Target Device 104 by Location Server 120

| Type of Data | Data Items |
| --- | --- |
| Definition of Mobile Structure | Unique Mobile Structure global ID<br>Mobile structure local ID (unique with respect to target 104) - use of a local ID may reduce the number of bits to be transmitted<br>Type of mobile structure (e.g. ship, plane, bus, train)<br>Name of mobile structure (e.g. name of a ship or plane)<br>Operator or Owner<br>Registration or other ID |
| Coordinate and Location Information | Whether default X, Y, Z axes are used or not<br>Civic (textual) definition of X, Y, Z axes if axes are not the default<br>Either (i) Definition of X, Y, Z origin<br>Or (ii) a Mobile Reference Point ID that serves as the X, Y, Z Origin<br>Preferred or required X, Y, Z scaling factors<br>Other Mobile Reference Point IDs within the structure<br>Related maps or construction plans (e.g. an identifier or name of a map or construction plan and an Internet address from where the map or construction plan can be downloaded) |
| State of Motion | Current absolute location and velocity of mobile structure 102<br>Current orientation (e.g. using 3 Euler angles) |

Location server 120 may first determine that target device 104 is on or within mobile structure 102 using conditions A, B, C or D in Table 1 and/or the methods of FIGS. 2b and 2c. Location server 120 may then provide the information in Table 2 to target device 104. Information on the X,Y,Z coordinate system may assist target device 104 to compute its location relative to mobile structure 102 and convert such relative location to an absolute location or vice versa.

Mobile reference points may be used to specify particular locations on mobile structure 102 that are fixed relative to mobile structure 102. The location of any mobile reference point may be specified in civic terms (i.e. as textual description) and/or may be indicated on a map or construction plan for mobile structure 102. A mobile reference point may be provided to define the origin for the X,Y,Z coordinate system and/or to define the location of a mobile radio beacon and/or to define the location of some point of interest on the mobile structure 102 (e.g. the entry way to a ship's restaurant, the location of the buffet car on a train, the location of an oxygen cylinder on an aircraft). Table 3 shows information specific to a mobile reference point that may be provided to target device 104 by location server 120 using positioning protocol 130.

TABLE 3

Mobile Reference Point Information provided using Positioning Protocol 130

| Type of Data | Data Items |
|---|---|
| Identification of mobile reference point | Reference Point Unique ID<br>Mobile structure global ID (identifies associated mobile structure) |
| Location | X, Y, Z coordinates of mobile reference point |
| Related Information | Mobile structure civic location (textual description of the reference point location within the mobile structure)<br>Floor level if applicable relative to the X, Y, Z Origin<br>Related mobile reference points within the same mobile structure<br>Map Data Information (reference to maps and/or construction plans within which the mobile reference point is identified) |

Positioning protocol 130 may support conveyance of mobile structure relative location—for example one mobile structure location $L1=(X_1,Y_1,Z_1)$ expressed relative to another mobile structure location $L2=(X_2,Y_2,Z_2)$. This can be defined using relative X,Y,Z coordinates—i.e. for example as $(X_1-X_2, Y_1-Y_2, Z_1-Z_2)$. Mobile structure relative location may also be used to provide the X,Y,Z coordinates of location L1 when location L2 is the origin.

The location, orientation and state of motion of a mobile structure 102 may be defined within positioning protocol 130 using the following: (i) mobile structure unique ID (if not already known), (ii) the absolute location of the X,Y,Z origin for the mobile structure, (iii) the mobile structure orientation (e.g. via 3 Tait-Bryan angles), and (iv) the linear velocity and angular velocity of the mobile structure. Mobile structure relative location may be converted to absolute location and vice versa once the absolute location and orientation of the mobile structure are provided. The location and orientation of the mobile structure may also be obtained if the absolute locations and mobile structure relative locations are known for 3 points on or within the mobile structure.

Table 4 shows additional assistance data that may be provided by location server 120 to target device 104 using positioning protocol 130 to assist determining location of target device 104 relative to mobile structure 102. The assistance data may be provided to enable target device 104 to identify mobile radio beacons (e.g. M1, M2 and M3 in FIG. 1) and optionally provide data about the associated mobile structure. The data may also assist target assisted positioning (where target device 104 makes measurements of radio beacons and sends these to location server 120 to compute a location) and target based positioning (where target device 104 obtains measurements and computes a location estimate from these measurements).

TABLE 4

Assistance Data that may be transferred to Target Device 104 using positioning protocol 130 to assist location relative to Mobile Structure 102

| Type of Data | Data Items |
|---|---|
| Mobile Structure Information | Mobile structure definition - e.g. as in Table 2<br>Mobile reference point definitions - e.g. as in Table 3<br>Location and orientation of the mobile structure (e.g. if known and currently static) |
| Assistance Data for Target based positioning | Identify mobile radio beacons by including a mobile structure ID (e.g. a global or local mobile structure ID as in Table 2) for any data provided for the following types of radio beacon:<br>Base stations<br>Home Base stations (or Femtocells)<br>WLAN APs<br>Other short range nodes (e.g. Bluetooth nodes) |
| Assistance Data for Target Assisted Positioning | Identify network cells or groups of cells (e.g. a Location Area) or a whole network that are supported by mobile radio beacons attached to a mobile structure. This may be achieved by including a mobile structure ID for any data provided for:<br>A cell ID,<br>A Location Area ID, or<br>A network ID |

For target based positioning, a target devoice 104 may use the assistance data defined in Table 4 to distinguish mobile radio beacons from fixed radio beacons and perform positioning relative to the mobile radio beacons to obtain X,Y,Z coordinates—e.g. using the method of FIG. 2d. The X,Y,Z coordinates or relative X,Y,Z coordinates obtained by target device 104 can then be returned to location server 120 using positioning protocol 130.

For target assisted positioning, a target device 104 may use the assistance data defined in Table 4 to report measurements for mobile radio beacons which may have been identified by inclusion of a mobile structure ID for network cells or network radio beacons according to Table 4.

A target device 104 may also make use of fixed and mobile radio beacons (identified according to Table 4) to determine whether it is on or within a mobile structure—e.g. using conditions A, B, C and D in Table 1.

FIG. 5a illustrates a block diagram of an apparatus for determining position of a target device with respect to a mobile structure according to some aspects of the present disclosure. At the apparatus 500, antenna 502 receives modulated signals from a base station and provides the received signals to a demodulator (DEMOD) part of a modem 504. The demodulator processes (e.g., conditions and digitizes) the received signal and obtains input samples. It further performs orthogonal frequency-division multiplexing (OFDM) demodulation on the input samples and provides frequency-domain received symbols for all subcarriers. An RX data processor 506 processes (e.g., symbol de-maps, de-interleaves, and decodes) the frequency-domain received symbols and provides decoded data to a controller/processor 508 of the apparatus 500.

The controller/processor 508 can be configured to control the apparatus 500 to communicate with a server via a wireless network. A TX data processor 510 generates signaling symbols, data symbols, and pilot symbols, which can be processed by modulator (MOD) of modem 504 and transmitted via the antenna 502 to a base station. In addition, the controller/processor 508 directs the operation of various processing units at the apparatus. Memory 512 can be configured to store program codes and data. Mobile target position module 514 can be configured to record positions of the target device relative to the one or more mobile reference points over a predetermined period of time to obtain a sequence of location estimates. In addition, the mobile target position module can be configured to determine whether the target device is within the mobile structure in accordance with the motion of the target device with respect to the mobile structure and the sequence of location estimates of the target device relative to the one or more mobile reference points. Motion sensors 516 can be configured to determine motion of a target device relative to the mobile structure.

According to embodiments of the present disclosure, the apparatus 500 may reside in a target device on the mobile structure in one implementation. In another implementation, the apparatus 500 may reside in a femtocell (also referred to as HeNB) or a Wireless Local Area Network Access Point on a mobile structure.

Figure 5B:
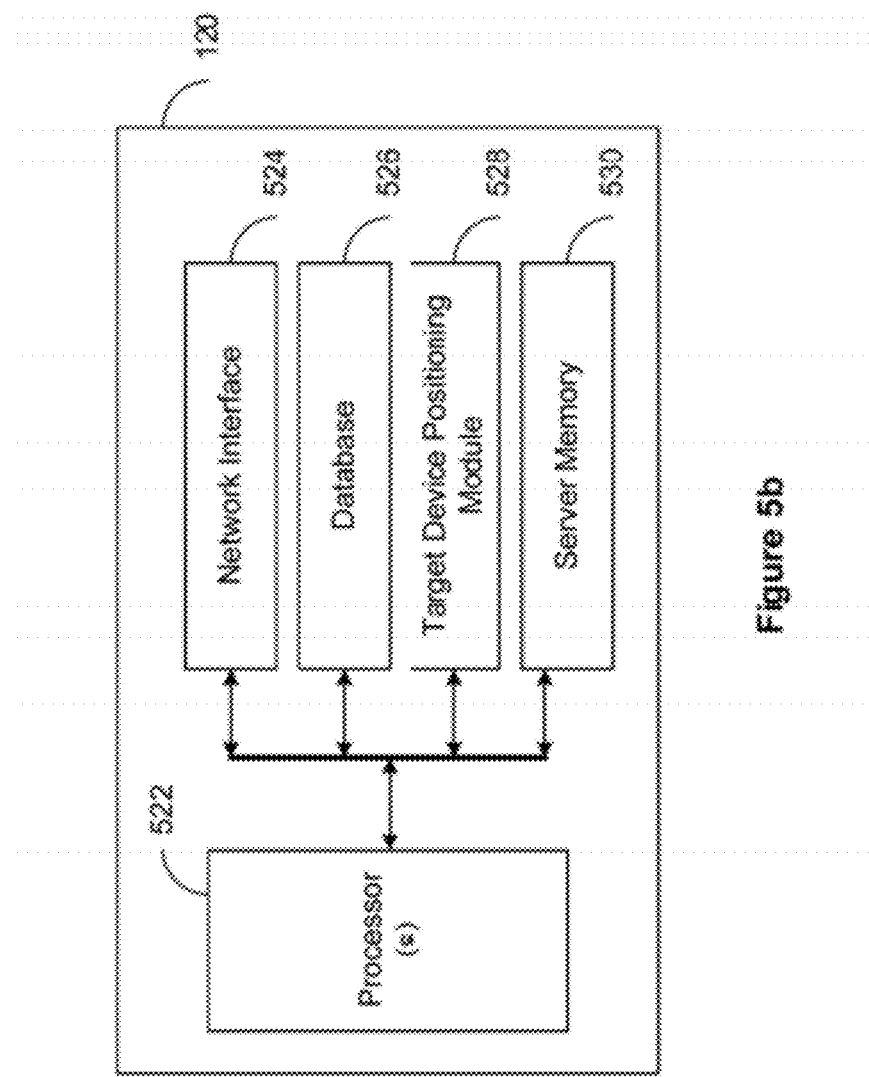
FIG. 5b illustrates a block diagram of a location server for determining position of a target device with respect to a mobile structure according to some aspects of the present disclosure.

FIG. 5*b* illustrates a block diagram of a location server for determining position of a target device with respect to a mobile structure according to some aspects of the present disclosure. In the example shown in FIG. 5*b*, location server 120 includes one or more processors 522, network interface 524, database 536, target device positioning module 528, and server memory 530. The one or more processors 522 can be configured to control operations of the location server 120. The network interface 524 can be configured to communicate with a network (such as network 118), which in turn may be configured to communicate with other servers, computers, and mobile devices. The database 526 can be configured to store the locations or relative locations of base stations, home base stations, WiFi APs (both fixed and on a mobile structure) and information about their transmission characteristics (e.g. antenna information, transmit power, transmit timing information). The target device positioning module 528 can be configured to implement methods of determining location of a target device as described in association with FIG. 1 through FIG. 4. The location server 120 may also interact with a target device to provide assistance data and request location measurements or a location estimate from the target device and determine the position of the target device based on the information obtained.

Note that paragraphs [0067]-[0069], FIG. 1, FIG. 2*a*, FIG. 5*a* and their corresponding descriptions provide means for obtaining measurements by the target device with respect to a plurality of radio beacons, means for determining whether the target device is on the mobile structure using the measurements, and means for determining location of the target device relative to the mobile structure using the measurements. Paragraphs [0067]-[0069], FIG. 1, FIG. 2*a*-2*c*, FIG. 5*a* and their corresponding descriptions provide means for comparing motion of target device with motion of mobile structure, means for detecting one or more mobile radio beacons on the mobile structure from the target device over a period of time, means for comparing velocity and location of the target device with respect to velocity and location of the mobile structure, means for comparing measurements obtained by target device from the plurality of radio beacons, and means for comparing locations obtained by target device from the plurality of radio beacons. In addition, they provide means for comparing whether measurements obtained by the target device with respect to one or more mobile radio beacons remain substantially unchanged, means for comparing whether measurements obtained by the target device with respect to one or more fixed radio beacons have changed, means for comparing whether relative location of the target device with respect to the one or more mobile radio beacons remains substantially unchanged, and means for comparing whether absolute location of the target device with respect to the one or more fixed radio beacons has changed. Paragraphs [0067]-[0069], FIG. 1, FIG. 2*d*-2*e*, FIG. 4*a*-4*d*, FIG. 5*a* and their corresponding descriptions provide means for obtaining at least one measurement of signal strength, signal quality and signal timing by the target device, means for determining location in a local coordinate system of the mobile structure, means for determining an absolute location of the target device in absolute coordinates from the measurements, means for converting the absolute location to a relative location using the absolute location and orientation of the mobile structure, and means for determining location of the target device using X,Y,Z coordinates for the mobile structure. Paragraphs [0067]-[0069], FIG. 1, FIG. 5*a*-5*b* and their corresponding descriptions provide means for communicating location information with a location server using a positioning protocol, where the positioning protocol includes at least one of 3GPP LTE Positioning Protocol (LPP) and OMA LPP Extensions (LPPe), and where the location information includes at least one of the obtained measurements and the determined location of the target device.

The methodologies described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method for determining location of a target device relative to a mobile structure, comprising:
   obtaining measurements by the target device with respect to a plurality of radio beacons;
   determining whether the target device is on the mobile structure using the measurements, wherein the determining whether the target device is on the mobile structure comprises at least one of: comparing motion of target device with motion of mobile structure, detecting one or more mobile radio beacons on the mobile structure from the target device over a period of time, comparing velocity and location of the target device with respect to velocity and location of the mobile structure, comparing measurements obtained by target device from the plurality of radio beacons, or comparing locations obtained by target device from the plurality of radio beacons; and
   determining location of the target device relative to the mobile structure using the measurements.

2. The method of claim 1, wherein the plurality of radio beacons include one or more mobile radio beacons on the mobile structure, and wherein the one or more mobile radio beacons include at least one of a base station, femtocell, Bluetooth node or a wireless local area network access point.

3. The method of claim 1, wherein the plurality of radio beacons includes at least one of a fixed radio beacon or a GNSS satellite.

4. The method of claim 1, wherein comparing measurements obtained by target device from the plurality of radio beacons comprises:
   comparing whether measurements obtained by the target device with respect to one or more mobile radio beacons remain substantially unchanged; and
   comparing whether measurements obtained by the target device with respect to one or more fixed radio beacons have changed.

5. The method of claim 1, wherein comparing locations obtained by target device from the plurality of radio beacons comprises:

comparing whether relative location of the target device with respect to the one or more mobile radio beacons remains substantially unchanged; and comparing whether absolute location of the target device with respect to the one or more fixed radio beacons has changed.

6. The method of claim 2, wherein location is determined using at least one measurement of signal strength, signal quality and signal timing in a local coordinate system of the mobile structure.

7. The method of claim 3, further comprising:
determining an absolute location of the target device in absolute coordinates from the measurements; and
converting the absolute location to a relative location using the absolute location and orientation of the mobile structure.

8. The method of claim 1, wherein determining location of the target device comprises:
determining location of the target device using X,Y,Z coordinates for the mobile structure.

9. The method of claim 1 further comprising:
communicating location information between the target device and a location server using a positioning protocol, wherein the positioning protocol includes at least one of 3GPP LTE Positioning Protocol (LPP) or OMA LPP Extensions (LPPe), and wherein the location information comprises at least one of the obtained measurements and the determined location of the target device.

10. The method of claim 9, wherein the location information comprises assistance data configured to assist the target device to obtain the measurements, wherein the assistance data comprises at least one of information of the mobile structure or information of a mobile reference point.

11. The method of claim 10, wherein the information of the mobile structure identifies one or more mobile radio beacons or network cells supported by the one or more mobile radio beacons.

12. The method of claim 1, wherein the mobile structure comprises at least one of:
a ship;
a plane;
a train;
a vehicle;
a submarine;
a mobile home;
a mobile office;
a space craft;
a space station; or
an oil drilling platform.

13. A location server, comprising:
one or more processors;
a target device positioning module configured to work with the one or more processors, wherein the target positioning module include logic for obtaining measurements by the target device with respect to a plurality of radio beacons;
logic for determining whether the target device is on the mobile structure using the measurements, wherein the logic for determining whether the target device is on the mobile structure comprises at least one of: logic for comparing motion of target device with motion of mobile structure, logic for detecting one or more mobile radio beacons on the mobile structure from the target device over a period of time, logic for comparing velocity and location of the target device with respect to velocity and location of the mobile structure, logic for comparing measurements obtained by target device from the plurality of radio beacons, or logic for comparing locations obtained by target device from the plurality of radio beacons;
logic for determining location of the target device relative to the mobile structure using the measurements; and
a memory configured to store the location of the target device relative to the mobile structure.

14. The location server of claim 13, wherein the plurality of radio beacons include one or more mobile radio beacons on the mobile structure, and wherein the one or more mobile radio beacons include at least one of a base station, femtocell, Bluetooth node or a wireless local area network access point.

15. The location server of claim 13, wherein the plurality of radio beacons includes at least one of a fixed radio beacon or a GNSS satellite.

16. The location server of claim 13, wherein logic for comparing measurements obtained by target device from the plurality of radio beacons comprises:
logic for comparing whether measurements obtained by the target device with respect to one or more mobile radio beacons remain substantially unchanged; and
logic for comparing whether measurements obtained by the target device with respect to one or more fixed radio beacons have changed.

17. The location server of claim 13, wherein logic for comparing locations obtained by target device from the plurality of radio beacons comprises:
logic for comparing whether relative location of the target device with respect to the one or more mobile radio beacons remains substantially unchanged; and
logic for comparing whether absolute location of the target device with respect to the one or more fixed radio beacons has changed.

18. The location server of claim 14, wherein logic for determining location of the target device relative to the mobile structure comprises:
logic for obtaining at least one measurement of signal strength, signal quality and signal timing by the target device; and
logic for determining location in a local coordinate system of the mobile structure.

19. The location server of claim 15, further comprising:
logic for determining an absolute location of the target device in absolute coordinates from the measurements; and
logic for converting the absolute location to a relative location using the absolute location and orientation of the mobile structure.

20. The location server of claim 13, wherein logic for determining location of the target device comprises:
logic for determining location of the target device using X,Y,Z coordinates for the mobile structure.

21. The location server of claim 13 further comprising:
a network interface configured to communicate location information with the target device using a positioning protocol, wherein the positioning protocol includes at least one of 3GPP LTE Positioning Protocol (LPP) or OMA LPP Extensions (LPPe), and wherein the location information comprises at least one of the obtained measurements and the determined location of the target device.

22. The location server of claim 21, wherein the location information comprises assistance data configured to assist the target device to obtain the measurements, wherein the assistance data comprises at least one of information of the mobile structure or information of a mobile reference point.

23. The location server of claim 22, wherein the information of the mobile structure identifies one or more mobile radio beacons or network cells supported by the one or more mobile radio beacons.

24. The location server of claim 13, wherein the mobile structure comprises at least one of:
   a ship;
   a plane;
   a train;
   a vehicle;
   a submarine;
   a mobile home;
   a mobile office;
   a space craft;
   a space station; or
   an oil drilling platform.

25. An apparatus, comprising:
   one or more processors;
   a mobile target positioning module configured to work with the one or more processors, wherein the mobile target positioning module include means for obtaining measurements by the target device with respect to a plurality of radio beacons;
   means for determining whether the target device is on the mobile structure using the measurements, wherein the means for determining whether the target device is on the mobile structure comprises at least one of: means for comparing motion of target device with motion of mobile structure, means for detecting one or more mobile radio beacons on the mobile structure from the target device over a period of time, means for comparing velocity and location of the target device with respect to velocity and location of the mobile structure, means for comparing measurements obtained by target device from the plurality of radio beacons, or means for comparing locations obtained by target device from the plurality of radio beacons;
   means for determining location of the target device relative to the mobile structure using the measurements; and
   a memory configured to store the location of the target device relative to the mobile structure.

26. The apparatus of claim 25, wherein the plurality of radio beacons include one or more mobile radio beacons on the mobile structure, and wherein the one or more mobile radio beacons include at least one of a base station, femtocell, Bluetooth node or a wireless local area network access point.

27. The apparatus of claim 25, wherein the plurality of radio beacons includes at least one of a fixed radio beacon or a GNSS satellite.

28. The apparatus of claim 25, wherein means for comparing measurements obtained by target device from the plurality of radio beacons comprises:
   means for comparing whether measurements obtained by the target device with respect to one or more mobile radio beacons remain substantially unchanged; and
   means for comparing whether measurements obtained by the target device with respect to one or more fixed radio beacons have changed.

29. The apparatus of claim 25, wherein means for comparing locations obtained by target device from the plurality of radio beacons comprises:
   means for comparing whether relative location of the target device with respect to the one or more mobile radio beacons remains substantially unchanged; and
   means for comparing whether absolute location of the target device with respect to the one or more fixed radio beacons has changed.

30. The apparatus of claim 26, wherein means for determining location of the target device relative to the mobile structure comprises:
   means for obtaining at least one measurement of signal strength, signal quality and signal timing by the target device; and
   means for determining location in a local coordinate system of the mobile structure.

31. The apparatus of claim 26, further comprising:
   means for determining an absolute location of the target device in absolute coordinates from the measurements; and
   means for converting the absolute location to a relative location using the absolute location and orientation of the mobile structure.

32. The apparatus of claim 25, wherein means for determining location of the target device comprises:
   means for determining location of the target device using X,Y,Z coordinates for the mobile structure.

33. The apparatus of claim 25 further comprising:
   means for communicating location information with a location server using a positioning protocol, wherein the positioning protocol includes at least one of 3GPP LTE Positioning Protocol (LPP) or OMA LPP Extensions (LPPe), and wherein the location information comprises at least one of the obtained measurements and the determined location of the target device.

34. The apparatus of claim 33, wherein the location information comprises assistance data configured to assist the target device to obtain the measurements, wherein the assistance data comprises at least one of information of the mobile structure or information of a mobile reference point.

35. The apparatus of claim 34, wherein the information of the mobile structure identifies one or more mobile radio beacons or network cells supported by the one or more mobile radio beacons.

36. The apparatus of claim 25, wherein the mobile structure comprises at least one of:
   a ship;
   a plane;
   a train;
   a vehicle;
   a submarine;
   a mobile home;
   a mobile office;
   a space craft;
   a space station; or
   an oil drilling platform.

37. A computer program product for determining location of a target device relative to a mobile structure, comprising a non-transitory medium storing computer programs for execution by one or more computer systems, the computer program product comprising:
   code for obtaining measurements by the target device with respect to a plurality of radio beacons;
   code for determining whether the target device is on the mobile structure using the measurements, wherein the code for determining whether the target device is on the mobile structure comprises at least one of: code for comparing motion of target device with motion of mobile structure, code for detecting one or more mobile radio beacons on the mobile structure from the target device over a period of time, code for comparing velocity and location of the target device with respect to velocity and location of the mobile structure, code for comparing measurements obtained by target device from the plurality of radio beacons, or code for comparing locations obtained by target device from the plurality of radio beacons; or code for determining location of the target device relative to the mobile structure using the measurements.

38. The computer program product of claim 37, wherein the plurality of radio beacons include one or more mobile radio beacons on the mobile structure, and wherein the one or more mobile radio beacons include at least one of a base station, femtocell, Bluetooth node or a wireless local area network access point.

39. The computer program product of claim 37, wherein the plurality of radio beacons includes at least one of a fixed radio beacon or a GNSS satellite.

40. The computer program product of claim 37, wherein code for comparing measurements obtained by target device from the plurality of radio beacons comprises:

code for comparing whether measurements obtained by the target device with respect to one or more mobile radio beacons remain substantially unchanged; and code for comparing whether measurements obtained by the target device with respect to one or more fixed radio beacons have changed.

41. The computer program product of claim 37, wherein code for comparing locations obtained by target device from the plurality of radio beacons comprises:

code for comparing whether relative location of the target device with respect to the one or more mobile radio beacons remains substantially unchanged; and code for comparing whether absolute location of the target device with respect to the one or more fixed radio beacons has changed.

42. The computer program product of claim 38, wherein location is determined using at least one measurement of signal strength, signal quality and signal timing in a local coordinate system of the mobile structure.

43. The computer program product of claim 39, further comprising:

code for determining an absolute location of the target device in absolute coordinates from the measurements; and code for converting the absolute location to a relative location using the absolute location and orientation of the mobile structure.

44. The computer program product of claim 37, wherein code for determining location of the target device comprises:

code for determining location of the target device using X,Y,Z coordinates for the mobile structure.

45. The computer program product of claim 37 further comprising:

code for communicating location information between the target device and a location server using a positioning protocol, wherein the positioning protocol includes at least one of 3GPP LTE Positioning Protocol (LPP) or OMA LPP Extensions (LPPe), and wherein the location information comprises at least one of the obtained measurements and the determined location of the target device.

46. The computer program product of claim 45, wherein the location information comprises assistance data configured to assist the target device to obtain the measurements, wherein the assistance data comprises at least one of information of the mobile structure or information of a mobile reference point.

47. The computer program product of claim 46, wherein the information of the mobile structure identifies one or more mobile radio beacons or network cells supported by the one or more mobile radio beacons.

48. The computer program product of claim 37, wherein the mobile structure comprises at least one of:

a ship;
a plane;
a train;
a vehicle;
a submarine;
a mobile home;
a mobile office;
a space craft;
a space station; or
an oil drilling platform.

* * * * *